United States Patent Office 3,440,949
Patented Apr. 29, 1969

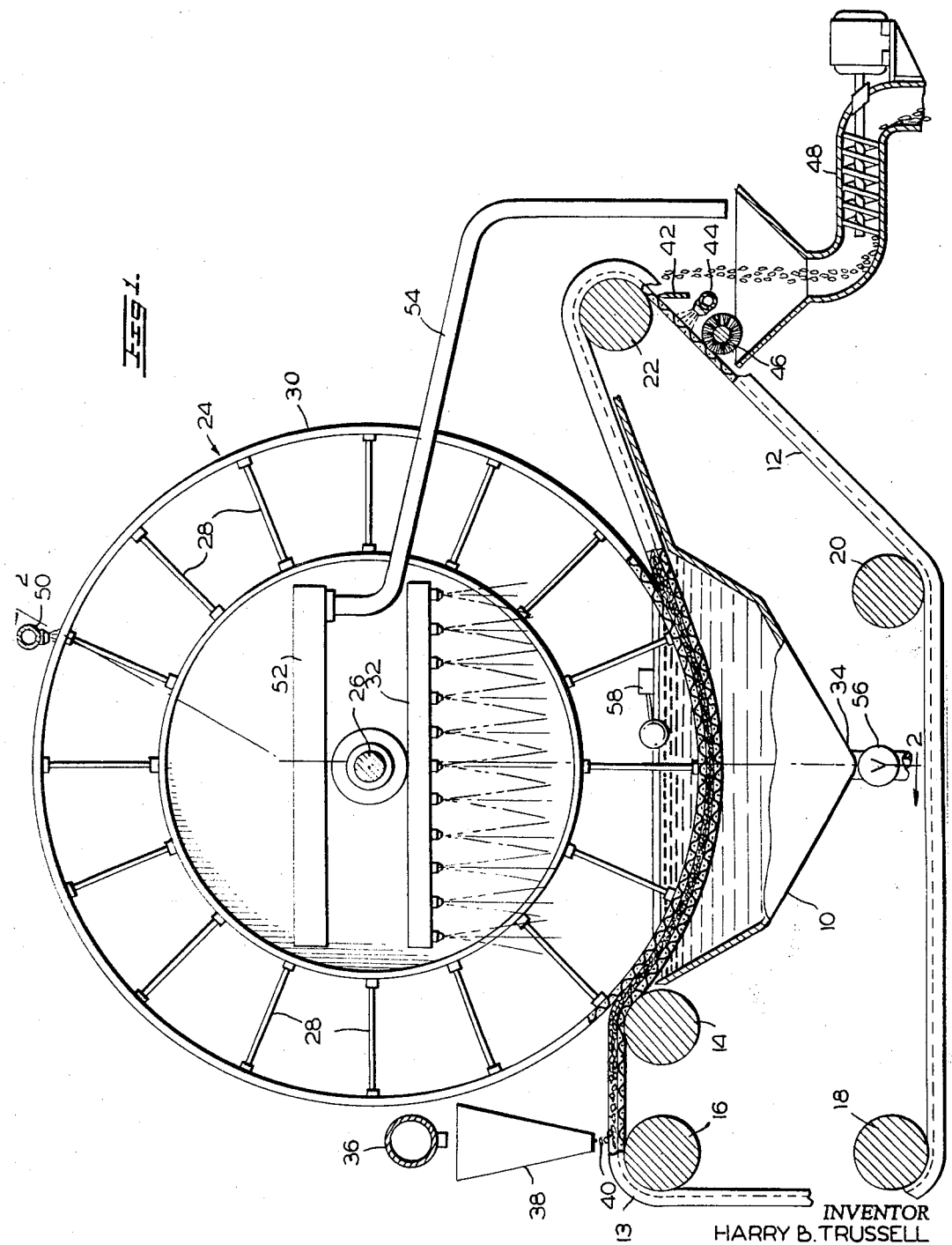

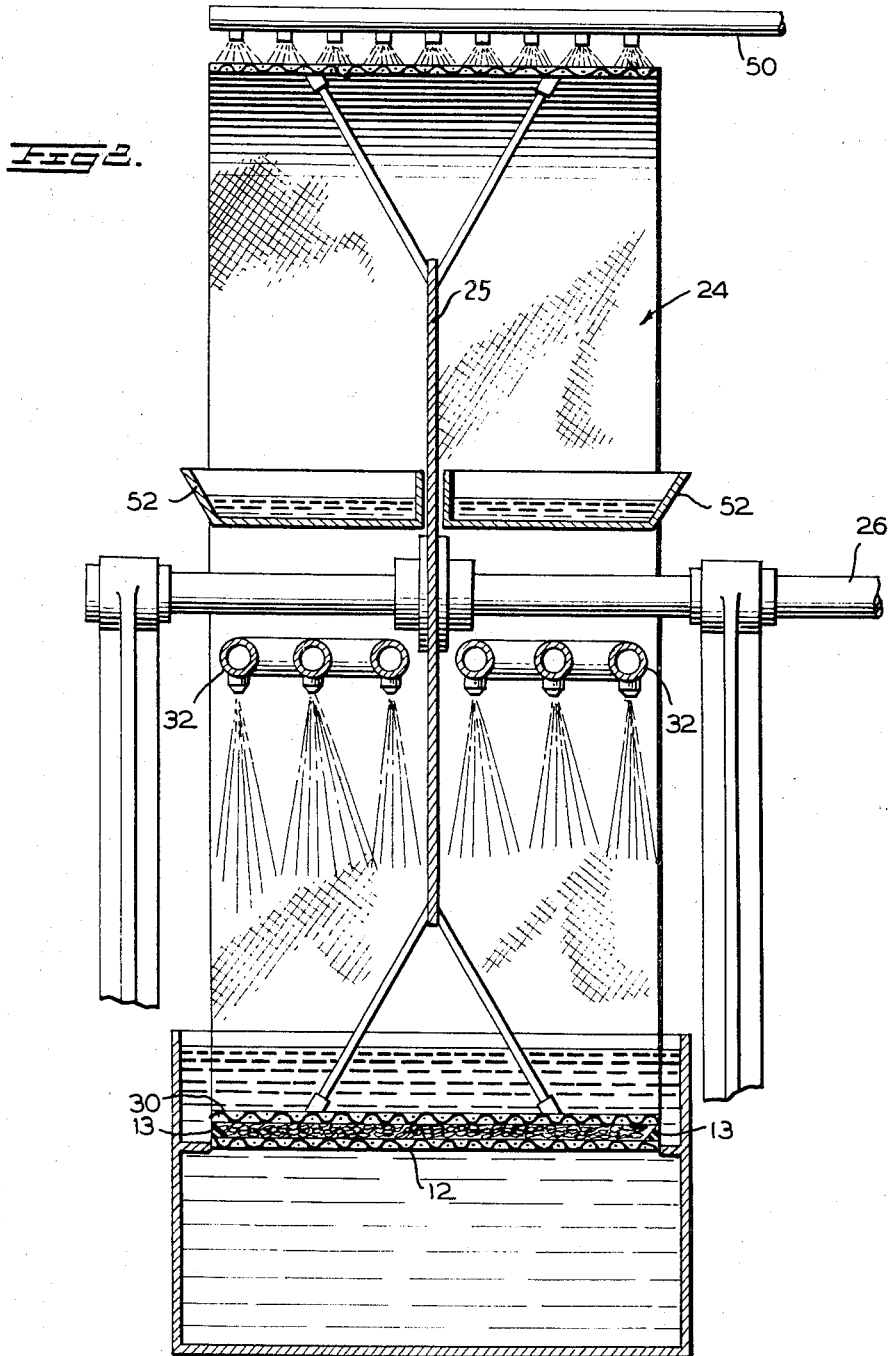

3,440,949
PROCESSING WASTE RECOVERY SYSTEM
Harry B. Trussell, 609 Stokeswood Ave., SE.,
Atlanta, Ga. 30316
Filed Oct. 22, 1965, Ser. No. 502,001
Int. Cl. A23k 1/00
U.S. Cl. 99—235                               4 Claims

ABSTRACT OF THE DISCLOSURE

Apparatus for removing organic matter from an aqueous organic solution primarily for the purpose of producing animal feed therefrom. The apparatus comprises two coacting conveyors maintaining a continually moving fibrous bed therebetween. Means are provided for circulating the solution through the moving bed which entraps any organic matter in the solution.

---

This invention relates generally to fluid treatment and more particularly to an apparatus for removing organic matter from an aqueous solution which organic matter may be further processed to produce animal feed.

This invention is particularly applicable, but not limited to, the field of animal processing and is specifically directed to the recovery of waste from the effluent from poultry processing plants.

In present day poultry processing systems, an increasingly serious problem is encountered in the disposal of contaminated processing effluent from the system. The present art poultry processing methods require the use of large quantities of water, on the order of millions of gallons per day for the average plant, this water, under present practices, being exhausted from the operation in a highly contaminated state. As current Federal and state programs for preserving or returning the waterways of this country to acceptable levels of purity progress, the sinks for depositing such waste are diminishing and the disposition or treatment of the effluent from processing plants is becoming an increasingly critical factor in the overall economics of the poultry industry.

The primary problem area in the present art treatment of the effluent from processing plants lies in the difficulty of filtration of the processing exhaust water to remove contaminating organic matter therefrom. In current practice, water, at a high rate of flow, is channeled through troughs disposed under bird processing lines in the plant. The troughs generally consist of a large flow-away trough for conveying waste viscera for disposal and several smaller secondary troughs for conveying specific organs of the bird from the point of bird cleaning. In processing, the bird, properly prepared for processing, is opened and eviscerated. The viscera is pulled out and severed from the carcass at the rectum and the crop, and the heart, liver and gizzard are trimmed from the viscera for placement in specified secondary troughs for transmission to packing or further processing points and the remaining organs are then dropped into the large flow-away trough for disposal. Prior to disposition, the gizzard is split open, emptied and rinsed in the main flow-away trough. The contents of the flow-away trough proceed by gravity flow, to a filtering area where the water and the viscera are separated by standard filtration methods. The effluent from the flow-away trough contains small particles of blood, tissue, fat, feed, feces and other organic matter which increase the biological oxygen demand of the effluent solution thereby contaminating the exhaust stream. Under present sewage disposal regulations, a sewage disposal plant or lagoon system is required to treat this effluent since, because of present art methods of filtration, it is impossible to eliminate or diminish the discharge of the small particles of fat, feed, tissue and blood from the effluent water to a point where the B.O.D. is sufficiently low. Prior art methods of filtering the effluent, either through tumbling apparatus or vibration filter screens are of little use in removing the contaminating microparticels because of the high fat content suspended or suponified in the effluent water. This fat content coats the surfaces of the filtering elements and acts as an accumulating surface to attract and retain solid particles in the stream. This accumulation loads up the pores of the filter elements to a point where an undesirably large pressure differential is imposed across the elements thereby forcing passage of particles through the filter which would otherwise be retained if the filter were under a normal pressure differential. Even though the filters may be continually backwashed, the rapid and continuous nature of loading of the filter elements from the above causes makes the process of effective filtration, particularly of the micro-particles, almost impossible from an economy standpoint.

It is an object of this invention to reduce the heavy requirements for water in animal processing plants by providing a novel method and apparatus for filtering the effluent therefrom.

It is another object of the invention to prevent contamination of the processing water effluent from poultry processing plants by providing a novel method and apparatus to filter small particles of fat, feed, tissue and blood from the effluent.

It is still another object of this invention to reduce the biological oxygen demand of processing water effluent from poultry processing plants by recovering the small particles of animal tissue from the effluent.

It is still another object of this invention to provide an apparatus which is capable of filtering substantially all particles of fat, feed, tissue and blood from animal processing water effluent.

It is still another object of this invention to reduce the biological oxygen demand of processing water effluent from poultry processing plants by recovering substantially all of the small particles of organic matter from the effluent.

It is still another object of this invention to provide an efficient and improved apparatus for processing poultry by recovering substantially all of the animal tissue, waste, and organs from the processing water effluent therefrom.

These and other objects of the invention will become better understood to those skilled in the art by reference to the following detailed description when viewed in light of the accompanying drawings wherein like elements thereof are indicated by like numerals throughout the figures and wherein:

FIGURE 1 is a schematic view in elevation of an apparatus incorporating features in accordance with the invention;

FIGURE 2 is a sectional view of the apparatus of FIGURE 1 taken along the lines 2—2 thereof.

Turning now to FIGURE 1, the apparatus comprises a fluid container or chamber 10 through which a first or lower porous or mesh endless conveyor belt 12 passes. The belt is provided with elastomeric curbs 13 on either edge thereof. The belt 12 is entwined around rollers 14, 16, 18, 20 and 22. A second or upper conveyor, in the form of a wheel 24, is disposed above the conveyer belt 12 and coacts therewith to deform the conveyer belt in a concave fashion within the container 10.

With reference to FIGURE 2, the wheel 24 is mounted on a central axis 26 through a plurality of spokes 28 which are arranged in a fashion similar to that of the bicycle wheel tapering outwardly from a hub 25 on the axle 26 towards the periphery of the wheel. A mesh screen surface 30 is formed around the circumference of the wheel 24 and is preferably of a large size, such, for example, as on the order of one-half inch. The size of the screen or mesh forming the belt 12 is on the order of 300 mesh. Processing water effluent distributing heads 32, disposed on either side of the hub 25, serve to distribute the effluent from the processing plant into the container 10 above the conveyer belt 12 and the lower portion of the periphery of the wheel 24. A filtered effluent discharge 34 is disposed in he bottom of the container to draw off the fluids in the container beneath the belt 12.

A feather hasher or grinder 36 receives fowl feathers from a suitable source for comminution therein and discharge into comminuted feather distributing hopper 38. The hopper 38 distributes the comminuted feathers in a bed 40 on the belt 12 proximate the portion thereof entering the container 10.

A belt cleaner grouping comprising a knife 42, a backwash distributing head 44 and a brush 46 rotating in opposition to the travel of the belt 12, is disposed proximate the portion of the belt coming from the container 10 to remove the bed 40 and contaminates therefrom. The bed and material removed from the belt drops into a receptacle and conveyor 48 disposed beneath the belt cleaner.

A backwash distributing head 50, for the wheel 24, is disposed proximate the upper portion of the periphery thereof to provide cleaning of the screen 30 at that point. A pair of wheel backwash effluent receptacles 52 are arranged proximate either side of the spokes 28 of the wheel beneath the wheel backwash distributing head 50 to receive the effluent therefrom and to convey it through a conduit 54 for discharge into the receptacle and conveyer 48.

A valve means 56 is disposed in the discharge 34 and is connected to a fluid level sensing device 58 proximate the upper end of the container 10 to control the fluid level in the container.

In the operation of the device, poultry feathers from the processing plant, or other suitable source, are introduced into the hasher 36 and are ground into a fine, consistent mesh. From the hasher, the comminuted feather mesh is introduced into the distributing hopper 38 for distribution in an even bed, spread across the belt 12 between the curbs 13 to form a felt-like bed thereon. Means (not shown) are provided to rotate either the wheel 24 and/or one or more of the rollers about which the belt 12 is entwined. With these means energized, the wheel 24 and the belt 12 move in the direction of the arrows in the figure. The discharge from the processing plant is admitted to the effluent heads 32 and is discharged into the container 10. The valve means 56 remains closed, so that the fluid level builds up in the container, until it reaches the level of the sensing device 58 at which point the device causes the valve means 56 to open allowing flow through the discharge 34. The device 58 monitors the level of the fluid, opening and closing the valve means 56 as required, to maintain the fluid in the container 10 at a desired level.

As the effluent, an aqueous solution of organic material such as saponified or suspended fat particles, tissue, blood, feed, fecal matter and the like, migrates toward the bottom of the container 10, it passes through the bed 40. The bed serves as a filter to catch the organic material and thereby acts as a filter for the solution. Since the mesh or grid of the wheel 24 is large in size, as was described above, to act as a retainer for the bed 40 rather than as a filter, it thereby is not subject to the disadvantages of clogging, loading up and the like that the prior art filters encounter. Since the bed 40 is continually moving, it is constantly being replaced with a fresh bed so that, as it loads up, it is removed from filtering action. The rate of movement of the bed through the container 10 is preferably such that it leaves the container prior to loading up to a degree that an undesirable pressure differential across the bed would be created. This rate is best determined experimentally for the particular solution to be filtered.

As the bed 40 leaves the container 10 and passes over the roller 22, the greater portion thereof is dumped into the receptacle and conveyer 48. The portion remaining, removed from the belt 12 by the knife 42, the backwash distributing head 44 and the brush 46, drops into the receptacle and conveyer 48. The material in the receptacle and conveyer 48 may then be transmitted to an animal food processing apparatus, such as that disclosed in applicant's co-pending application, Ser. No. 482,109, filed Aug. 24, 1965, for recovery of the nutritional value therein. The mesh screen 30 on the wheel 24 is cleaned by the wheel backwash head 50 to remove adhering particles of fatty matter and other material for transmission to the receptacle and conveyer 48 through the wheel backwash receptacle 52 and conduit 54.

Obviously, hair, organic fibers or other similar material may be substituted for the poultry feathers used to form the bed in the above-described apparatus as desired or available without exceeding the intended scope of this invention. The apparatus may also be applied to the filtration of other fluids under conditions where standard filters would be loaded up at a rate which would make standard filtration too expensive or unworkable.

What has been set forth above is intended to be exemplary of an embodiment in accordance with the teachings of this invention to enable those skilled in the art in the practice thereof. Obviously, many modifications could be made to the apparatus as specifically taught such, for example, as a substitution of a second conveyer and roller device for the wheel 44, without exceeding the intended scope of the invention.

What is new and therefore desired to be protected by Letters Patent of the United States is:

1. An apparatus for removing organic matter from an aqueous-organic solution comprising:
    a container, an inlet and outlet in said container, means for continuously circulating an aqueous-organic solution through said container between said inlet and outlet;
    a perforate conveyer means traversing said container intermediate said inlet and outlet to intersect the path of circulation of said solution;
    means proximate one end of said conveyer to continuously dispense a bed of fibrous material thereon for movement through siad container to entrap organic matter from the solution passing therethrough, and means proximate the other end of said conveyer to remove the bed of fibrous material and entrapped organic matter therefrom;
    and a second perforate conveyor means coacting with said conveyer means to contact said bed during movement thereof through said container to maintain a bed intact on said conveyor means.

2. An apparatus for removing organic matter from an organic-aqueous solution comprising:
    a container, a solution inlet proximate the upper portion of said container and solution outlet proximate the bottom portion of said container, an organic-aqueous solution distributing head disposed above said container for circulating said solution through said container between said inlet and said outlet, and means including a valve disposed in said outlet to maintain a constant fluid level in said container;
    a conveyer means including a perforate endless belt traversing said container beneath the surface of the fluid level therein to intersect the path of circulation of said solution;
    means proximate one end of the travel of said belt to continuously disperse a bed of comminuted fowl feathers thereon for movement through said container to entrap organic matter from the solution passing therethrough, and cleaning means proximate the other end of the travel of said belt to remove said bed and entrapped organic matter therefrom and to clean contaminates from said belt;

a second conveyer means disposed above said first mentioned conveyer means and coacting therewith during movement through said container to maintain said bed intact on said belt.

3. An apparatus in accordance with claim 2 wherein said second conveyer comprises a wheel having a perforate periphery thereto and mounted for rotation about a horizontal axis transverse to the path of said belt, the periphery of said wheel being disposed to contact said bed substantially throughout the travel thereof through said container, and means to continuously clean the periphery of said wheel subsequent to contact with said bed.

4. An apparatus for removing organic matter from an aqueous-organic solution comprising:
 a container, an inlet and outlet in said container, means for continuously circulating an aqueous-organic solution through said container between said inlet and outlet;
 a perforate conveyer means traversing said container intermediate said inlet and outlet to intersect the path of circulation of said solution;
 means proximate one end of said conveyer to continuously dispense a bed of fiberous material thereon for movement through said container to entrap organic matter from the solution passing therethrough, and means proximate the other end of said conveyer to remove the bed of fiberous material and entrapped organic matter therefrom.

References Cited

UNITED STATES PATENTS

| 2,111,720 | 3/1938 | Padgett | 210—400 XR |
| 2,975,055 | 3/1961 | Brown et al. | 99—7 |
| 3,250,207 | 5/1966 | Moyle et al. | 99—235 |
| 3,272,632 | 9/1966 | Speer | 99—7 XR |

BILLY J. WILHITE, *Primary Examiner.*

U.S. Cl. X.R.

99—7; 210—400, 152, 173